United States Patent [19]

Knowles et al.

[11] 4,399,770
[45] Aug. 23, 1983

[54] PROCESS AND APPARATUS FOR FISH GROWTH ACCELERATION

[76] Inventors: Albert H. Knowles; Robert H. Rines, both of 13 Spaulding St., Concord, N.H. 03301

[21] Appl. No.: 360,563
[22] Filed: Mar. 22, 1982

Related U.S. Application Data

[63] Continuation of Ser. No. 181,831, Aug. 27, 1980, abandoned.

[51] Int. Cl.³ .................................. A01K 63/00
[52] U.S. Cl. ........................................... 119/3
[58] Field of Search ........................... 119/3, 2, 4, 5

[56] References Cited

U.S. PATENT DOCUMENTS

| | | | |
|---|---|---|---|
| 3,320,928 | 5/1967 | Smith | 119/3 |
| 3,698,359 | 10/1972 | Fremont | 119/3 |
| 4,271,788 | 6/1981 | Knowles | 119/3 |

FOREIGN PATENT DOCUMENTS 1762 of 1901 United Kingdom ................. 119/3

Primary Examiner—Hugh R. Chamblee
Attorney, Agent, or Firm—Rines and Rines, Shapiro and Shapiro

[57] ABSTRACT

This disclosure is concerned with novel cover arrangements for providing dark stacking and rest areas in confined water volumes for fish growth acceleration, including salmonoids and the like, and involving pluralities of closely spaced covers contacting the water and providing successive dark areas while influencing water circulation by the edges of the covers to swirl feed thereat; forms of these arrangements being adapted both for land-constructed pools or ponds, and confined effective pool or pond volumes in the sea constructed as netted sea cages bordered by floating or exposed walkways and the like.

24 Claims, 3 Drawing Figures

PROCESS AND APPARATUS FOR FISH GROWTH ACCELERATION

This is continuation application of Ser. No. 181,831, filed Aug. 27, 1980, now abandoned.

The present invention relates to improvements in water-contacting covers or related light-blocking apparatus for accelerating fish growth, such as of salmonoids and other fish, being more particularly, though not exclusively directed to uses in the larger-size land-based pools or ponds, or sea cages that serve as in situ pools or ponds.

The phenomenon of accelerating fish growth through providing dark rest areas under light-blocking water-contacting covers (floating or submerged) in which the fish may stack, and from which they may observe and momentarily dart out for circulating feed in illuminated regions (preferably extended illumination over 24 hours or so) bordering the dark areas, and wherein they have been found to feed without agitation, competition and disfiguring one another, and with remarkably increased growth over, and in greater densities than obtainable with, equivalent ponds, pools or cages not provided with such water-contacting covers, is described in co-pending U.S. patent application, Ser. No. 65,617, entitled "PROCESS AND APPARATUS FOR ACCELERATING GROWTH RATE OF SALMONOIDS AND OTHER FISH AND THE LIKE". As an illustration, salmon parr in ponds so equipped have attained over 100% weight growth increase over a 12-month period over equivalent ponds not so equipped, and with at least a doubling of density of fish in the same pond.

While this system has been found to work admirably well both in fresh and salt water pools or ponds (where these terms are generically used to embrace also sea-net cages bordered at the surface with exposed or floating walkways or the like), it is sometimes awkward and expensive to construct and to handle and use large-size covers for the larger pools or ponds or cages, (say 10 meters in cross dimension or greater), even if provided with hinged or separable connections. It is to this problem, among others, that the present invention is accordingly directed, it being an object of the invention to provide a new and improved process and apparatus for enabling the effective use of pluralities of relatively small covers in larger contained water volumes of such pools, pools or cages and the like.

A further object is to provide an improved water-contacting cover apparatus particularly useful in sea cages and the like where rough water, icing and other deletereous environmental factors may be present at times.

Still another object is to provide novel cover apparatus for these and related purposes.

Other and additional objects will be explained hereinafter, being more particularly delineated in the appended claims. In summary, from one of its important aspects, the invention embraces a process for accelerating the growth of fish in a contained water volume bounded by a border at least at the surface of the water, that comprises, populating the volume with fish and circulating water in said volume while applying feed thereto; providing a plurality of light-blocking covers each in contact with the water and disposed successively partially to extend along said border and inwardly therefrom to provide successive dark areas along said border for the stacking and resting of the fish in darkness in the successive areas under the successive covers; and the uncovered regions of the water surface exposing the feed circulating past the edges of the covers through said volume to the fish stacked under the covers. Preferred constructional and operational details and best mode embodiments are hereinafter presented.

The invention will now be described in connection with the accompanying drawings, FIG. 1 of which is an isometric view of a preferred embodiment, operating in accordance with the process of the invention;

FIG. 3 is a similar view of an adaptation particularly suited for sea cage volumes and the like.

Figure 1:
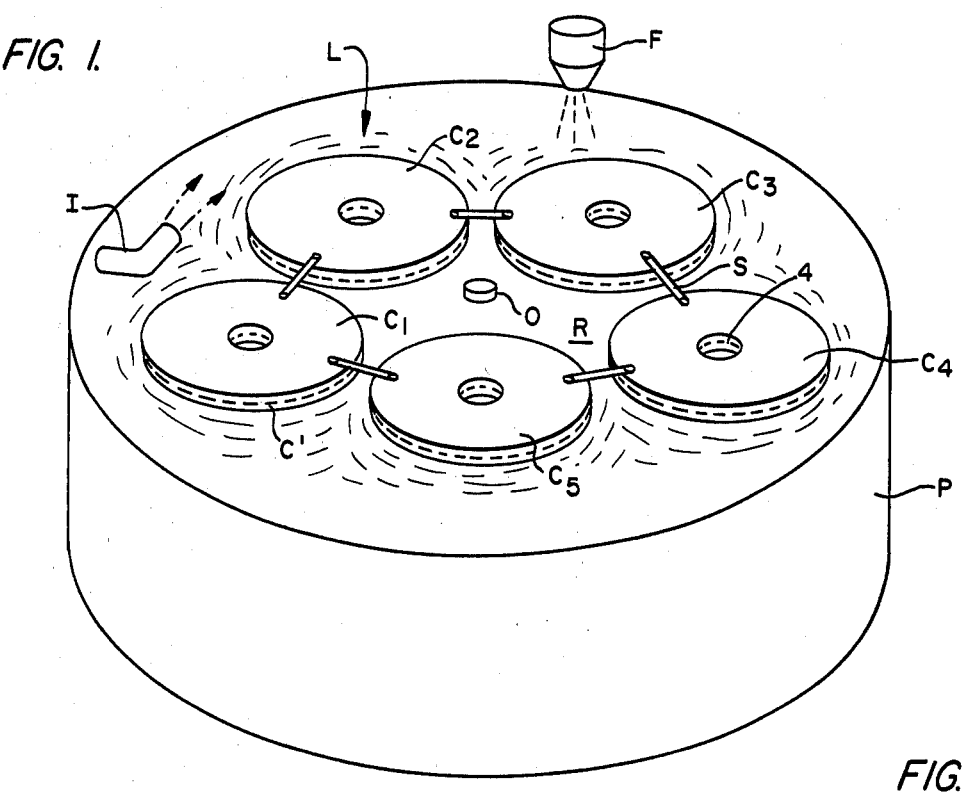

Referring to FIG. 1, a circular pond P, say of about 7 to 10 meters in diameter cross-section, or greater, is shown provided with a plurality (illustrated as five) of similar light-blocking (such as opaque fiberglass, for example) floating covers $C_1$–$C_5$, illustrated as of the generally convex circular type described in said patent application, the peripheral lip edges of which contact the water surface and create the before-mentioned dark, shadow stacking and rest areas thereunder. Inlet water is ejected at angles, as shown at I, to circulate the same around the pond P, exiting at a center generally filtered pipe O, and circulating feed as it drops under gravitational influence from a periodically operated, conventional solenoid shutter control feeder generally shown at F. The feed is observable in the illuminated regions beyond the cover edges (preferably with 24-hour or other extended illumination downwardly directed, as at L), by the fish resting in stacks in the successive dark areas under each of the successively laterally disposed covers $C_1$ through $C_5$. The covers themselves are successively positioned, as by successive straps S, to extend in fixed relative position along the border walls of the pond P, and inwardly therefrom, but preferably somewhat spaced therefrom, as illustrated, to provide illuminated regions along preferably the total periphery of the covers. In addition, the surface tension and water-guiding effect of the cover lips (preferably provided with an inner floating-supporting ring as of foam polyurethane or the like, generally indicated at $C^1$), causes deflecting or the circulating of the water current established by the inlet I between the successive spaced covers, as shown by the whirl lines in the drawing, carrying feed therebetween and between the covers and the pool border and serving also to hold the feed up a substantial time before gravity finally takes over.

The convex upper surface of each of the floating covers provides thereunder a varying-dimension air space, increasing towards the center, to assist in keeping the cover clean and enabling fish that may jump out onto the top of the cover, to roll back into the water.

The covers $C_1$–$C_5$ that extend along the inner periphery of the circular pool border are also shown provided with internal lipped smaller-diameter central apertures 4 also contacting the water, and useful as additional illuminated feed regions, but also to enable the individual covers also to be handled and used in smaller ponds where the outlet pipe may extend through such apertures. A further feature of the invention is the relatively still region R of the pond that results from the above construction, as distinguished from the faster circulating region adjacent the pool border walls, and which has been found to keep the feed suspended and promote active feeding as the fish, resting in dark stacks under the covers, dart radially inward to the more quiet illuminated region R and then return to their original positions in the dark resting area under the cover from which they originated. Increasing feeding without agitation has been found to result, as before stated. If desired, moreover, a larger space may be provided between the adjacent covers at the inlet I to accomodate the initial circulating action; but in any event, the spacing from covers to the pool border walls and from cover to cover are preferably small compared with the cover dimensions—indeed, a small fraction thereof.

As an example, salmon parr near the smolt condition, disposed in a 20-foot pond P, with five covers $C_1$-$C_5$, as shown, each about $6\frac{1}{2}$ feet in outer diameter and spaced about 8" from the pool border and from each other, were found, on the average, to weigh up to ten percent more than their counterparts in a similar uncovered pond in only about three weeks in the open, in northern Scotland (May).

Figure 2:
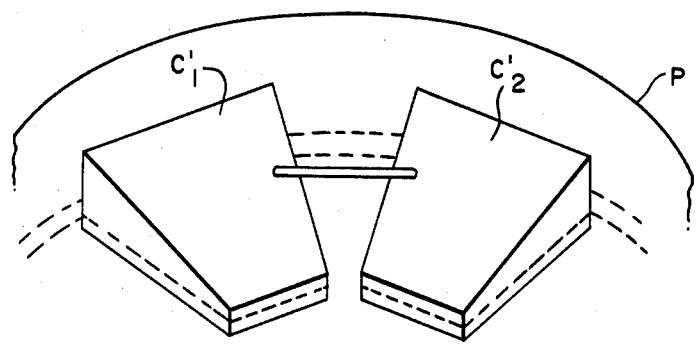
FIG. 2 is a fragmentary view similar to FIG. 1 of a modified structure.

Other shapes, including square, rectangular and other polygonic and curved forms of covers may be used, depending upon the application; FIG. 2 illustrating, for example, substantially trapezoidal polygonic contour constructions $C^1{}_1$, $C^1{}_2$, etc. floating preferably spaced slightly from the pool border and from each other. The construction is tapered (shown from outer to inner edge of the covers) to provide an increasing air space under and across each of the plurality of floating covers from center towards the pool border, and again an inclined upper outer surface for tumbling fish that may have jumped thereupon, back into the pool.

Figure 3:
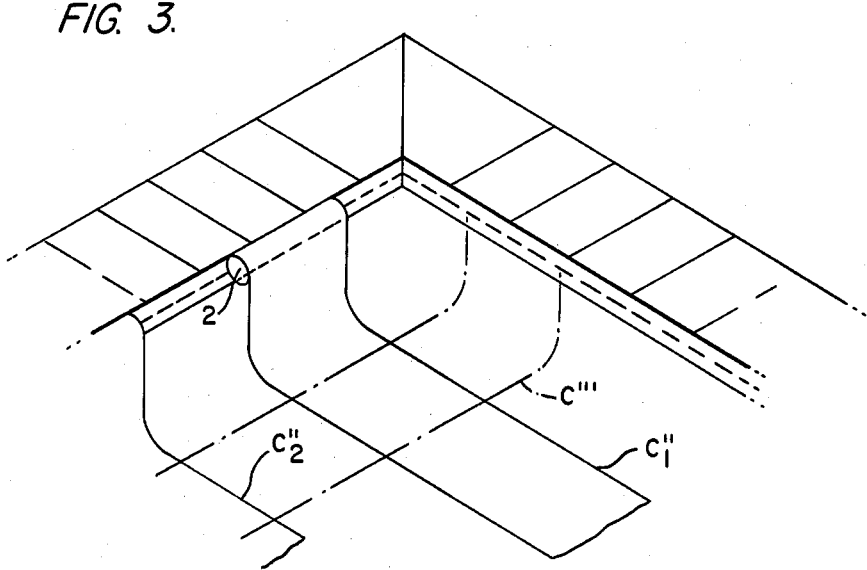

The above and related constructions are well adapted for use both in land-based and water or sea-based contained volumes, the latter usually being contained by nets hung from a surface floating or exposed walkway border and usually referred to as cages, and before mentioned. In connection with such sea cage volumes, where storms, icing and other deletereous environmental factors may come into play, other forms of pluralities of covers—preferably of soft resilient material as of butyl rubber or the like (to avoid fish damage) and preferably submerged under the water surface and extending along the borders of the walkways or the like—may be employed. One illustration thereof is shown in FIG. 3 in the form of successive spaced submerged soft rubber sheets $C_1''$, $C_2''$, etc. hung to extend between opposing rectangular or square walkways or borders and preferably somewhat spaced therefrom, as before discussed. For cleaning of other maintenance, these covers may be withdrawn at one border by conventional means, such as pulleys 2. Orthogonally extending sheet covers $C'''$ may also border the other sides of the walkways, if desired, providing a border covering extending along the inner periphery of the walkway border.

Further modifications will also occur to those skilled in this art and such are considered to fall within the spirit and scope of the invention as defined in the appended claims.

What is claimed is:

1. A process for accelerating the growth of fish in a contained water volume bounded by a border at least at the surface of the water comprising providing the water volume with a plurality of light-blocking covers, each in contact with the water surface so as to form a dark area thereunder for the stacking and resting of fish, disposing the covers in the water volume in an array providing a peripheral uncovered water region between the array of covers and the border for the circulation of feed to the fish, and a central uncovered water region within the array of covers, and circulating feed past the edges of the covers in said peripheral water region.

2. A process as claimed in claim 1 and in which the fish are salmonoids and the like.

3. A process as defined in claim 1, wherein each of the covers is spaced from the adjacent covers and the covers are disposed to provide substantial stillness of the water in said central region during circulation of feed in the peripheral region.

4. A process as claimed in claim 1 and in which each of the covers is spaced from the adjacent water-volume border and from the adjacent covers to define illuminated feed regions therebetween.

5. A process as claimed in claim 4 and in which the spaces from the border are small compared with the cover dimension.

6. A process as claimed in claim 4 and in which the spaces between covers are small compared with the cover dimension.

7. A process as claimed in claim 4 and in which the edges of the covers contact the water to cause deflection of the circulating water current, carrying the feed into the spaces between the covers and the covers and the borders.

8. A process as claimed in claim 4 and in which the covers are held in fixed relative positional relationship.

9. A process as claimed in claim 4 and in which the covers are of substantially circular contour and floating on lips contacting the water surface.

10. A process as claimed in claim 9 and in which the covers are provided with internal central apertures defined by lips contacting the water and of cross-dimension small compared with that of the covers.

11. A process as claimed in claim 9 and in which the cover is of substantially convex contour.

12. A process as claimed in claim 4 and in which the covers are of substantially trapezoidal contour floating on peripheral lips contacting the water surface.

13. A process as claimed in claim 12 and in which the lips are of varying height between opposing edges of the covers to provide an air space of increasing dimensions therebetween and to provide an outer inclined cover to roll fish back into the pool.

14. A process as claimed in claim 4 and in which which the underside of the covers contains an air space above the water surface to assist in keeping the cover clean.

15. A process as claimed in claim 14 and in which the air space is of varying dimensions between the edges of the covers.

16. Apparatus for accelerating the growth of fish comprising in combination, means defining a contained water volume bounded by a border at least at the surface of the water, a plurality of light-blocking covers each disposed within said border in contact with the water surface and forming a dark area thereunder for the stacking and resting of fish, the covers being disposed in an array providing a peripheral uncovered water region between the array of covers and the border, for the circulation of feed to the fish, and a central uncovered water region within the array of covers, and means for circulating feed past the edges of the covers in said peripheral water region.

17. A combination as defined in claim 16, wherein each of the covers is spaced from the adjacent covers and the covers provide substantial stillness of the water in said central region during circulation of feed in said peripheral region.

18. The combination of claim 16 and in which the covers are at least partly submerged below the water surface.

19. The combination of claim 16 and in which the covers extend substantially along a curved line, including within a circle.

20. The combination of claim 16 wherein each of the covers is spaced from adjacent volume border and from the adjacent covers to define deflecting water-circulating feed regions therebetween.

21. The combination of claim 20 and in which the spaces from the border and the spaces between successive covers are small compared with the cover dimensions.

22. The combination of claim 21 and in which the covers are of substantially circular contour with respective lips floating each cover of the array of covers on the water surface.

23. The combination of claim 20 and in which the covers are of polygon contour with lips floating the covers on the water surface.

24. The combination of claim 23 and in which the covers are of substantially trapezoidal shape with an increasing air space thereunder across the cover.

* * * * *